(12) United States Patent
Yi et al.

(10) Patent No.: US 11,685,833 B2
(45) Date of Patent: Jun. 27, 2023

(54) POLYAMIDE COMPOSITION AND MOLDED ARTICLE MADE OF THE SAME WITH IMPROVED MECHANICAL STRENGTH AND REDUCED WEIGHT

(71) Applicants: Hyundai Motor Company, Seoul (KR); Kia Motors Corporation, Seoul (KR); KTP Industries, Inc., Gyeongsangbuk-do (KR)

(72) Inventors: Seul Yi, Seoul (KR); Boo Youn An, Busan (KR); Dae Sik Kim, Gyeonggi-do (KR); In Soo Han, Gyeonggi-do (KR); Kyeong Hoon Jang, Seoul (KR); Jin Gi Ahn, Seoul (KR); Byung Seok Kong, Gyeonggi-do (KR); Seong Won Seo, Gyeongsangbuk-do (KR)

(73) Assignees: Hyundai Motor Company, Seoul (KR); Kia Motors Corporation, Seoul (KR); KTP Industries, Inc., Gyeongsangbuk-do (KR)

( * ) Notice: Subject to any disclaimer, the term of this patent is extended or adjusted under 35 U.S.C. 154(b) by 242 days.

(21) Appl. No.: 17/109,792

(22) Filed: Dec. 2, 2020

(65) Prior Publication Data
US 2021/0214554 A1    Jul. 15, 2021

(30) Foreign Application Priority Data
Jan. 14, 2020 (KR) .................. 10-2020-0004643

(51) Int. Cl.
| | | |
|---|---|---|
| *C08L 77/06* | (2006.01) | |
| *C08K 7/14* | (2006.01) | |
| *C08K 5/00* | (2006.01) | |
| *B29C 45/00* | (2006.01) | |
| *C08J 5/24* | (2006.01) | |

(52) U.S. Cl.
CPC .......... *C08L 77/06* (2013.01); *B29C 45/0001* (2013.01); *C08J 5/249* (2021.05); *C08K 5/005* (2013.01); *C08K 7/14* (2013.01); *C08K 2201/003* (2013.01); *C08L 2205/02* (2013.01)

(58) Field of Classification Search
CPC .......... C08L 2205/02; C08L 2205/025; C08L 77/02; C08L 77/04; C08L 77/05; C08L 77/10; C08L 77/06
See application file for complete search history.

(56) References Cited

U.S. PATENT DOCUMENTS

2019/0136053 A1* 5/2019 Takamasa .............. C08K 3/013

FOREIGN PATENT DOCUMENTS

| KR | 10-2018-0038266 A | 4/2018 |
|---|---|---|
| KR | 10-2020-0043797 A | 4/2020 |

\* cited by examiner

*Primary Examiner* — Ana L. Woodward
(74) *Attorney, Agent, or Firm* — Fox Rothschild LLP

(57) ABSTRACT

Disclosed herein are a polyamide composition and a molded article made of the same with improved mechanical strength and reduced weight. The molded article may include the polyamide composition that includes high flowable polyamide and polyphthalamide and a small-diameter fiber, thereby resulting in an improvement in mechanical strength while achieving excellent surface properties and high weight reduction.

7 Claims, No Drawings

POLYAMIDE COMPOSITION AND MOLDED ARTICLE MADE OF THE SAME WITH IMPROVED MECHANICAL STRENGTH AND REDUCED WEIGHT

CROSS-REFERENCE TO RELATED APPLICATION

This application claims under 35 U.S.C. § 119(a) the benefit of priority to Korean Patent Application No. 10-2020-0004643 filed on Jan. 14, 2020, the entire contents of which are incorporated herein by reference.

TECHNICAL FIELD

The present invention relates to a polyamide composition and a molded article made of the same with improved mechanical strength and reduced weight. The polyamide composition may include highly flowable polyamide and polyphthalamide and a small-diameter fiber and the molded article may be made of the same polyamide composition, thereby resulting in an improvement in mechanical strength thereof while achieving excellent surface properties and high weight reduction.

BACKGROUND

Although a cowl cross beam (CCB) for an existing vehicle is made of metal to increase mechanical strength, this beam may account for a large portion of the increase in the weight of the vehicle. For this reason, there has been an attempt to replace the metal of the cowl cross beam with long-fiber-reinforced thermoplastics (LFT) made by mixing polyamide 66 and polyphthalamide with fibers. However, the long-fiber-reinforced thermoplastics (LFT) have significantly low in mechanical strength compared to the metal.

Meanwhile, the polyphthalamide is generally a copolymer consisting of polyamide 6T, polyamide 6I, and polyamide 6/6 at various rates to control properties such as a melt flow, a melting point, and a glass transition temperature, which typically includes polyamide 6T as a main base material.

The above information disclosed in this Background section is only for enhancement of understanding of the background of the invention and therefore it may contain information that does not form the prior art that is already known in this country to a person of ordinary skill in the art.

SUMMARY

In preferred aspects, provided are a novel polyamide composition and a molded article including the same, such that the molded article may have excellent mechanical strength.

In one preferred aspect, provided is a long-fiber-reinforced thermoplastic (LFT) capable of achieving weight reduction while exhibiting mechanical strength similar to that of metal used for a vehicle cowl cross beam (CCB).

In one preferred aspect, provided is a polyamide composition that can be used to produce a molded article with improved surface quality.

The present invention is not limited to the above-mentioned aspects. Other aspects and advantages of the present invention can become apparent from the following description of the present invention and be realized by the means as claimed and combinations thereof.

In an aspect, provided is a polyamide composition that includes a primary resin including polyamide, a secondary resin including polyphthalamide, a fiber, and a heat-resistant agent. Preferably, the fiber is a long fiber, which has a length substantially large multiples of a diameter or a size of the cross-section of the fiber. For example, the length of the long fiber is about 100 times, about 150 times, about 200 times, about 250 times, about 300 times, about 350 times, about 400 times, about 450 times, about 500 times, about 550 times, about 600 times, about 650 times, about 700 times, about 750 times, about 800 times, about 850 times, about 900 times, about 950 times, or about 1000 times of the diameter of the fiber.

The primary resin and the secondary resin may be the same or different type. In certain aspect, the first and second resins are different, these resins are different in physical or chemical properties such as polydispersity index (PDI). For example, the first resin has the PDI value different from the PDI value of the second resin by at least 5, 10, 20, 25, 30, 35, 40, 45, 60, 70, 80 or 90%.

Further, the primary resin, the second resin, the fiber and the heat-resistant agent are each different or distinct materials present in the polyamide composition.

The primary resin may include one or more selected from the group consisting of polyamide 6, polyamide 66, polyamide 12, polyamide 6/66, polyamide 6/12, and polyamide 6/6T.

The polyphthalamide may have a coefficient of thermal expansion (CTE) of about 55.0 μm/m° C. to 70.0 μm/m° C. at a temperature of about 23° C. to 55° C., a melting point of about 260° C. to 300° C., and a glass transition temperature of about 110° C. to 150° C.

The secondary resin may suitably include polyphthalamide 6I.

The fiber may suitably have a diameter of about 10 μm to 17 μm.

The fiber may include one or more selected from the group consisting of a glass fiber, a metal fiber, a carbon fiber, a polymer fiber, and a natural fiber.

The heat-resistant agent may include one or more selected from the group consisting of a phosphorus compound, a sulfur compound, and a metal salt compound.

The polyamide composition may include the primary resin in an amount of about 50 to 58.5 parts by weight based on 100 parts by weight of the fiber.

The polyamide composition may include the secondary resin in an amount of about 5.8 to 14.2 parts by weight based on 100 parts by weight of the fiber.

The polyamide composition may include the heat-resistant agent in an amount of about 1.6 to 3.4 parts by weight based on 100 parts by weight of the fiber.

In an aspect, provided is a molded article produced by mixing the polyamide composition described herein and injection molding thereof.

The molded article may have a tensile strength of about 315 MPa or greater measured according to ISO 527, a flexural strength of about 450 MPa or greater measured according to ISO 178, and a Charpy impact strength of about 35 KJ/m$^2$ or greater measured according to ISO 179/1eA.

Other aspects of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Throughout the invention, like reference numerals refer to like parts throughout the various figures and embodiments of the present invention. The drawings are not necessarily to scale and in some instances, proportions may have been exaggerated in order to clearly illustrate features of the embodiments. Although the terms first, second, etc. may be used herein to describe various elements, these elements should not be limited by these terms. These terms may be only used to distinguish one element from another element. For example, without deviating from the scope and spirit of the present invention, a first element may be referred to as a second element, and, similarly, a second element may also be referred to as a first element. As used herein, the singular forms "a", "an" and "the" are intended to include the plural forms as well, unless context clearly indicates otherwise.

It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof. In addition, it will be understood that when an element, such as a layer, a membrane, a region, or a plate, is referred to as being "above" or "on" another element, it can be "immediately above" the other element or intervening elements may also be present. In contrast, it will be understood that when an element, such as a layer, a membrane, a region, or a plate, is referred to as being "beneath" or "under" another element, it can be "immediately beneath" the other element or intervening elements may also be present.

Unless otherwise indicated, it should be understood that all numbers, values, and/or expressions quantitatively expressing ingredients, reaction conditions, polymer compositions, and combinations used herein are modified in all instances by the term "about" since these are approximations that reflect various uncertainties in measurement occurring essentially to obtain such values among others. In addition, when numerical ranges are disclosed herein, these ranges are contiguous and include all values from a minimum value to a maximum value, inclusive of the maximum value, unless otherwise indicated. Furthermore, when these ranges refer to integers, the ranges include all integers from a minimum value to a maximum value, inclusive of the maximum value, unless otherwise indicated.

In the specification, when ranges are described for variables, it will be understood that the ranges include all variable values inclusive of endpoints subsumed therein. It will be understood that, for example, the range "5 to 10" includes any subranges, such as 6 to 10, 7 to 10, 6 to 9, or 7 to 9, as well as values of 5, 6, 7, 8, 9, and 10, and also includes any values between integers suitable for the range such as 5.5, 6.5, 7.5, 5.5 to 8.5, and 6.5 to 9. In addition, it will be understood that, for example, the range "10% to 30%" includes any subranges, such as 10% to 15%, 12% to 18%, or 20% to 30%, as well as all integers of 10%, 11%, 12%, and 13%, inclusive of up to 30%, and also includes any values between integers suitable for the range such as 10.5%, 15.5%, and 25.5%.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a polyamide composition and a molded article made of the same.

The polyamide composition includes a primary resin containing polyamide, a secondary resin containing polyphthalamide, a fiber (e.g., long fiber), and a heat-resistant agent.

Hereinafter, the primary resin, secondary resin, fiber, and heat-resistant agent included in the polyamide composition of the present invention will be described separately.

Primary Resin

The primary resin includes polyamide. Preferably, the primary resin may include one or more selected from the group consisting of polyamide 6, polyamide 66, polyamide 12, polyamide 6/66, polyamide 6/12, polyamide 6/6T, and polyamide 6/6I. The primary resin may suitably include polyamide 66.

The polyamide 66 may be prepared by condensation polymerization of a hexamethylenediamine monomer and an adipic acid monomer.

As a result of measurement using a formic acid, the polyamide 66 may have a relative viscosity of about 34.0 to 37.0 and a weight average molecular weight ranging from about 10,000 to 21,000 g/mol.

The primary resin may be included in an amount of about 50 to 58.5 parts by weight based on 100 parts by weight of the fiber. When the amount of the primary resin is greater than about 58.5 parts by weight, the effect of the secondary resin may not be sufficient, with the consequence that it is difficult to decrease the crystallization temperature of the polyamide composition to result in deterioration of the appearance surface quality of the molded article. On the other hand, when the amount of the primary resin is less than about 50 parts by weight, the effect of the secondary resin may be relatively excessive, with the consequence that the phase separation between the resins occurs to result in deterioration of the mechanical rigidity of the molded article.

Secondary Resin

The secondary resin includes aromatic polyamide. For example, the secondary resin contains polyphthalamide.

The polyphthalamide may have a density of about 1.00 g/cc or more, preferably about 1.10 to 2.00 g/cc. The polyphthalamide may have a mold shrinkage of about 0.001 cm/cm to 0.005 cm/cm measured according to ISO 294-4 and ISO 2577, a coefficient of thermal expansion (CTE) of about 55.0 μm/m° C. to 70.0 μm/m° C. measured at a temperature of about 23 to 55° C. according to ISO 11359-1, a melting point of about 260° C. to 300° C. measured according to ISO 11357-1, and a glass transition temperature of about 110° C. to 150° C.

Preferably, the polyphthalamide may include amorphous polyphthalamide 6I. For example, the polyphthalamide may include only polyamide 6I as a base material.

The amorphous polyphthalamide may be mixed with the polyamide 66 as the primary resin to decrease the crystallization temperature of the polyamide composition, resulting in an improvement in the appearance surface of the molded article and an enhancement in the physical strength or the like of the molded article. When the polyphthalamide contains crystalline polyamide such as polyamide 6T or polyamide 6/6 commonly used, the flowability of the polyamide composition may not be improved, which may lead to breakage of the fiber and restriction on the contact area with the fiber.

The secondary resin may be included in an amount of about 5.8 to 14.2 parts by weight based on 100 parts by weight of the fiber. Preferably, the secondary resin may be included in an amount of 9 to 12 parts by weight. When the amount of the secondary resin is less than about 5.8 parts by weight, the flowability of the polyamide composition may not be improved. On the other hand, when the amount of the secondary resin is greater than about 14.2 parts by weight, the phase separation between the resins may occur to cause a reduction in the mechanical strength of the molded article.

Long Fiber

The fiber may suitably have a diameter of about 10 to 17 μm. Preferably, the fiber may have a diameter of about 13 to 14 μm. When the diameter of the fiber is less than about 10 μm, there may be an increasing probability that the fiber is broken without enduring the shear stress applied during the impregnation of the resin, resulting in a productivity reduction. On the other hand, when the diameter of the fiber is greater than about 17 μm, the contact area with the resin may be reduced to result in deterioration of the mechanical strength of the molded article.

There is commonly used a fiber having a relatively large diameter to minimize the breakage of the fiber. Preferably, the fiber may have a relatively small diameter, because the breakage of the fiber can be minimized due to using the high flowable primary resin and the amorphous secondary resin, thereby maximizing the contact area between the resin and the fiber to enhance the mechanical strength of the molded article.

The fiber may suitably have a length of about 5 to 25 mm, preferably about 9 to 12 mm.

The fiber may include one or more selected from the group consisting of a glass fiber, a metal fiber, a carbon fiber, a polymer fiber, and a natural fiber. The polymer fiber may suitably include, for example, at least one of an aramid fiber, a polyethylene terephthalate fiber, a polyetherether ketone fiber, an ultrahigh molecular weight polyethylene fiber, a liquid crystal polymer fiber, a polyacrylonitrile fiber, an arylate fiber, a rayon fiber, and a polyamide fiber.

Heat-Resistant Agent

The heat-resistant agent may reduce polymer pyrolysis. Since the polyamide composition is produced in a high-temperature environment, it is very important to prevent the polymer pyrolysis. Accordingly, in order to suppress the polymer pyrolysis in such a high-temperature environment, the heat-resistant agent may suitably be used.

The heat-resistant agent may include one or more selected from the group consisting of a phosphorus compound, a sulfur compound, and a metal salt compound.

The heat-resistant agent may be included in an amount of about 1.6 to 3.4 parts by weight based on 100 parts by weight of the fiber. When the amount of the heat-resistant agent is less than about 1.6 parts by weight, the effect of the heat-resistant agent may be insignificant. On the other hand, when the amount of the heat-resistant agent is greater than about 3.4 parts by weight, the heat-resistant agent itself may act as impurities, since the heat-resistant agent is excessively used more than necessary, resulting in deterioration of the mechanical strength of the molded article.

Molded Article

The molded article may be produced by mixing the polyamide composition as described herein and injection molding thereof.

The polyamide composition may be applied to a vehicle component, preferably a vehicle cowl cross beam (CCB) made of metal. For example, the molded article made of the polyamide composition may be advantageous in that the molded article is high in mechanical strength enough to be used for the vehicle CCB of the vehicle and is light in weight much higher than that made of existing metal materials.

The molded article may be superior to that made of existing polyamide compositions in tensile strength, flexural strength, and Charpy impact strength. Particularly, the molded article may have a tensile strength of about 315 MPa or greater measured at a test rate of 50 mm/min according to ISO 527, a flexural strength of about 450 MPa or greater measured at a test rate of 10 mm/min according to ISO 178, and a Charpy impact strength of about 35 KJ/m$^2$ or greater measured at a temperature of 23° C. according to ISO 179/1eA.

EXAMPLE

Hereinafter, the present invention will be described in more detail with reference to examples. However, these examples are only for illustrating the present invention and the scope of the invention is not limited thereto.

The compositions used in Example according to an exemplary embodiment of the present invention and Comparative Examples are as follows:

Polyamide 66: 21ZLV (available from Acend);
Polyphthalamide 6I: M5000 (available from Evonik);
Long Fiber: 423H (available from NEG); and
Heat-Resistant Agent: KN333HSMB (available from KOLON plastics).

Example 1: Production of Molded Article Using Polyamide Composition

A glass fiber was prepared having an average length of 10 mm and a diameter of 13 μm. Based on 100 parts by weight of the glass fiber, 54.2 parts by weight of polyamide 66 as a primary resin, 10 parts by weight of polyphthalamide 6I as a secondary resin, and 2.5 parts by weight of a heat-resistant agent were prepared separately and mixed with each other in a double-axial mixer (TEX-30), so that a mixture thereof is impregnated with the prepared glass fiber. Then, a pellet was prepared having a length of about 10 mm.

Comparative Examples 1 to 8

Polyamide compositions were prepared as indicated in the following Table 1 and pallets were prepared in the same manner as in the above Example 1.

TABLE 1

|  | Long Fiber (part by weight) | Primary Resin (part by weight) | Secondary Resin (part by weight) | Heat-Resistant Agent (part by weight) |
|---|---|---|---|---|
| Ex. 1 | 100 | 54.2 | 10 | 2.5 |
| Comp. Ex. 1 |  | 50.0 | 5 | 2.5 |
| Comp. Ex. 2 |  | 58.0 | 15 | 2.5 |
| Comp. Ex. 3 |  | 54.2 | 10 | 2.5 |
| Comp. Ex. 4 |  | 54.2 | 10 | 1.5 |
| Comp. Ex. 5 |  | 54.2 | 10 | 3.5 |
| Comp. Ex. 6 |  | 54.2 | 15 | 1.7 |
| Comp. Ex. 7 |  | 54.2 | 5 | 1.7 |
| Comp. Ex. 8 |  | 54.2 | 10 | 2.5 |

The primary resins, secondary resins, long fibers, and heat-resistant agents in Comparative Examples 1, 2, and 4 to 7 are the same as those in Example 1.
The long fiber in Comparative Example 3 has a diameter of 18 μm.
The secondary resin in Comparative Example 8 contains polyamide 6T and polyamide 6I in a weight ratio of 1:2.

Experimental Example

Molded articles were produced by injection molding of the pellets in Example 1 and Comparative Examples 1 to 8, and their tensile strength, flexural strength, and impact strength were then measured as indicated in the following Table 2.

TABLE 2

|  | Tensile Strength (MPa) | Flexural Strength (MPa) | Impact Strength (MPa) |
|---|---|---|---|
| Ex. 1 | 320 | 460 | 37.8 |
| Comp. Ex. 1 | 305 | 430 | 30.6 |
| Comp. Ex. 2 | 315 | 435 | 31.5 |
| Comp. Ex. 3 | 280 | 380 | 28.7 |
| Comp. Ex. 4 | 302 | 415 | 31.8 |
| Comp. Ex. 5 | 310 | 412 | 32.4 |
| Comp. Ex. 6 | 312 | 428 | 30.4 |
| Comp. Ex. 7 | 301 | 426 | 30.0 |
| Comp. Ex. 8 | 315 | 415 | 32.8 |

The tensile strength was measured at a test rate of 50 mm/min according to ISO 527.
The flexural strength was measured at a test rate of 10 mm/min according to ISO 178.
The impact strength was measured at a temperature of 23° C. according to ISO 179/1eA.

As shown in the measurement result in the above Table 2, the mechanical strength in Comparative Example 1 was less than that in Example 1 since in Comparative Example 1, the secondary resin was included in a very small amount so that the flowability of the resin is not sufficiently improved.

In Comparative Example 2, the secondary resin was contained excessively above a certain amount so that the phase separation between resins occurred to result in deterioration of mechanical strength.

In Comparative Example 3, the diameter of the long fiber was increased above a certain range so that the contact area with the resin was reduced to result in deterioration of mechanical strength.

In Comparative Example 4, the effect of the heat-resistant agent was significantly reduced to result in a reduction in material stability.

In Comparative Example 5, the heat-resistant agent itself acted as impurities to result in deterioration of mechanical strength.

The results in Comparative Examples 6 and 7 were similar to those in Comparative Examples 1 and 2.

In Comparative Example 8, the flowability of the resin may be reduced to result in deterioration of mechanical strength.

According to various exemplary embodiments of the present invention, the novel polyamide composition can be used to produce the molded article with excellent mechanical strength.

In addition, the long-fiber-reinforced thermoplastic (LFT) can achieve weight reduction while exhibiting mechanical strength similar to that of metal used for the vehicle cowl cross beam (CCB).

Furthermore, the polyamide composition can be used to produce the molded article with improved surface quality.

The present invention is not limited to the above effects. It should be understood that the present invention includes all effects which can be inferred from the above description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polyamide composition comprising:
a primary resin comprising polyamide;
a secondary resin comprising polyphthalamide;
a fiber; and
a heat-resistant agent,
wherein the polyamide comprises one or more selected from the group consisting of polyamide 6, polyamide 66, polyamide 12, polyamide 6/66, polyamide 6/12, and polyamide 6/6T,
wherein the polyphthalamide comprises polyphthalamide 6I,
wherein the fiber comprises one or more selected from the group consisting of a glass fiber, a metal fiber, a carbon fiber, and a natural fiber,
wherein the polyamide composition comprises the primary resin in an amount of about 50 to 58.5 parts by weight and the secondary resin in an amount of about 5.8 to 14.2 parts by weight, based on 100 parts by weight of the fiber.

2. The polyamide composition of claim 1, wherein the polyphthalamide has a coefficient of thermal expansion (CTE) of about 55.0 μm/m° C. to 70.0 μm/m° C. at a temperature of about 23° C. to 55° C., a melting point of about 260° C. to 300° C., and a glass transition temperature of about 110° C. to 150° C.

3. The polyamide composition of claim 1, wherein the fiber has a diameter of about 10 μm to 17 μm.

4. The polyamide composition of claim 1, wherein the heat-resistant agent comprises one or more selected from the group consisting of a phosphorus compound, a sulfur compound, and a metal salt compound.

5. The polyamide composition of claim 1, wherein the polyamide composition comprises the heat-resistant agent in an amount of about 1.6 to 3.4 parts by weight based on 100 parts by weight of the fiber.

6. A molded article produced by mixing a polyamide composition of claim 1 and injection molding thereof.

7. The molded article of claim 6, wherein the molded article has a tensile strength of about 315 MPa or more measured according to ISO 527, a flexural strength of about 450 MPa or greater measured according to ISO 178, and a Charpy impact strength of about 35 KJ/m² or greater measured according to ISO 179/1eA.

\* \* \* \* \*